United States Patent [19]
Papandreou

[11] Patent Number: 5,897,133
[45] Date of Patent: Apr. 27, 1999

[54] STEERING WHEEL WITH INTEGRAL AIR BAG COVER

[75] Inventor: John P. Papandreou, Medford, N.Y.

[73] Assignee: TRW Inc., Lyndhurst, Ohio

[21] Appl. No.: 08/910,034

[22] Filed: Aug. 11, 1997

Related U.S. Application Data

[63] Continuation-in-part of application No. 08/526,330, Sep. 11, 1995, abandoned.

[51] Int. Cl.$^6$ ..................................................... B60R 21/16
[52] U.S. Cl. ........................................ 280/728.2; 280/731
[58] Field of Search ................................ 280/728.2, 731, 280/728.3; 74/552

[56] References Cited

U.S. PATENT DOCUMENTS

| | | |
|---|---|---|
| 3,853,334 | 12/1974 | Auman et al. . |
| 3,944,250 | 3/1976 | Wulf et al. . |
| 5,005,860 | 4/1991 | Mori et al. . |
| 5,280,946 | 1/1994 | Adams et al. . |
| 5,294,147 | 3/1994 | Edge . |
| 5,314,203 | 5/1994 | Adams et al. . |
| 5,356,173 | 10/1994 | Hongou et al. . |
| 5,358,270 | 10/1994 | Kuretake et al. . |
| 5,465,998 | 11/1995 | Davis ........................................ 280/731 |
| 5,470,099 | 11/1995 | Williams . |
| 5,520,409 | 5/1996 | Saderholm ............................... 280/731 |
| 5,584,503 | 12/1996 | Lutz . |
| 5,615,910 | 4/1997 | Margetak et al. ....................... 280/731 |
| 5,676,396 | 10/1997 | Fohl ..................................... 280/728.2 |
| 5,685,557 | 11/1997 | Persson et al. ........................ 280/728.2 |
| 5,692,769 | 12/1997 | Scharboneau et al. ............... 280/728.2 |
| 5,692,770 | 12/1997 | Scharboneau et al. ............... 280/728.2 |
| 5,749,598 | 5/1998 | Exner et al. .......................... 280/728.2 |

FOREIGN PATENT DOCUMENTS 2158482  11/1971  Germany .

OTHER PUBLICATIONS

GMI Engineering and Management Institute Senior Thesis Project, "Design of a One–Piece Steering Wheel/Airbag Cover," by Mark Scharboneau dated May 28, 1993.

*Primary Examiner*—Paul N. Dickson
*Attorney, Agent, or Firm*—Tarolli, Sundheim, Covell, Tummino & Szabo

[57] ABSTRACT

An assembly is provided for mounting on a vehicle steering shaft which rotates about an axis to steer the vehicle. The assembly includes a steering wheel rim (34), an inflatable vehicle occupant restraint (47), an inflator (48) for providing inflation fluid for inflating the vehicle occupant restraint, and an integral cover (38, 39) covering the steering wheel rim, the vehicle occupant restraint and the inflator. The integral cover (38, 39) defines a chamber in which the inflatable vehicle occupant restraint (47) is located. A mounting (31) is fixedly connected to the steering wheel rim (34) and supports the inflatable vehicle occupant restraint (47) and the inflator (48). The mounting (31) has a portion (58) which receives the steering shaft and which is non-rotatably attachable to the steering shaft. A threaded fastener (61) fastens the mounting (31) to the steering shaft. The fastener (61) engages the mounting (31) and engages the steering shaft. A cover (53) associated with the mounting (31) encloses the mounting. The cover (53) has an access opening (62) for providing access to the fastener (61).

8 Claims, 5 Drawing Sheets

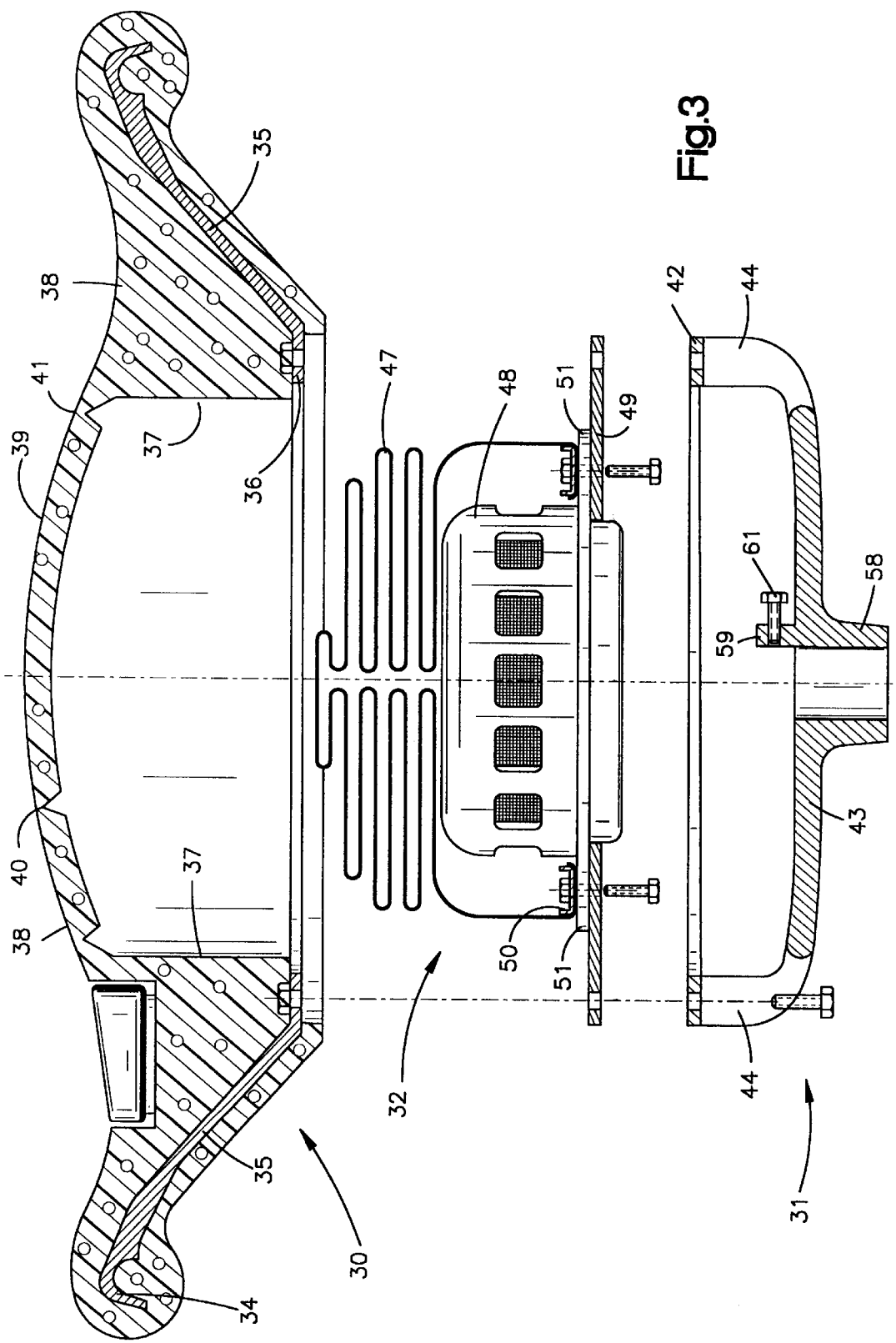

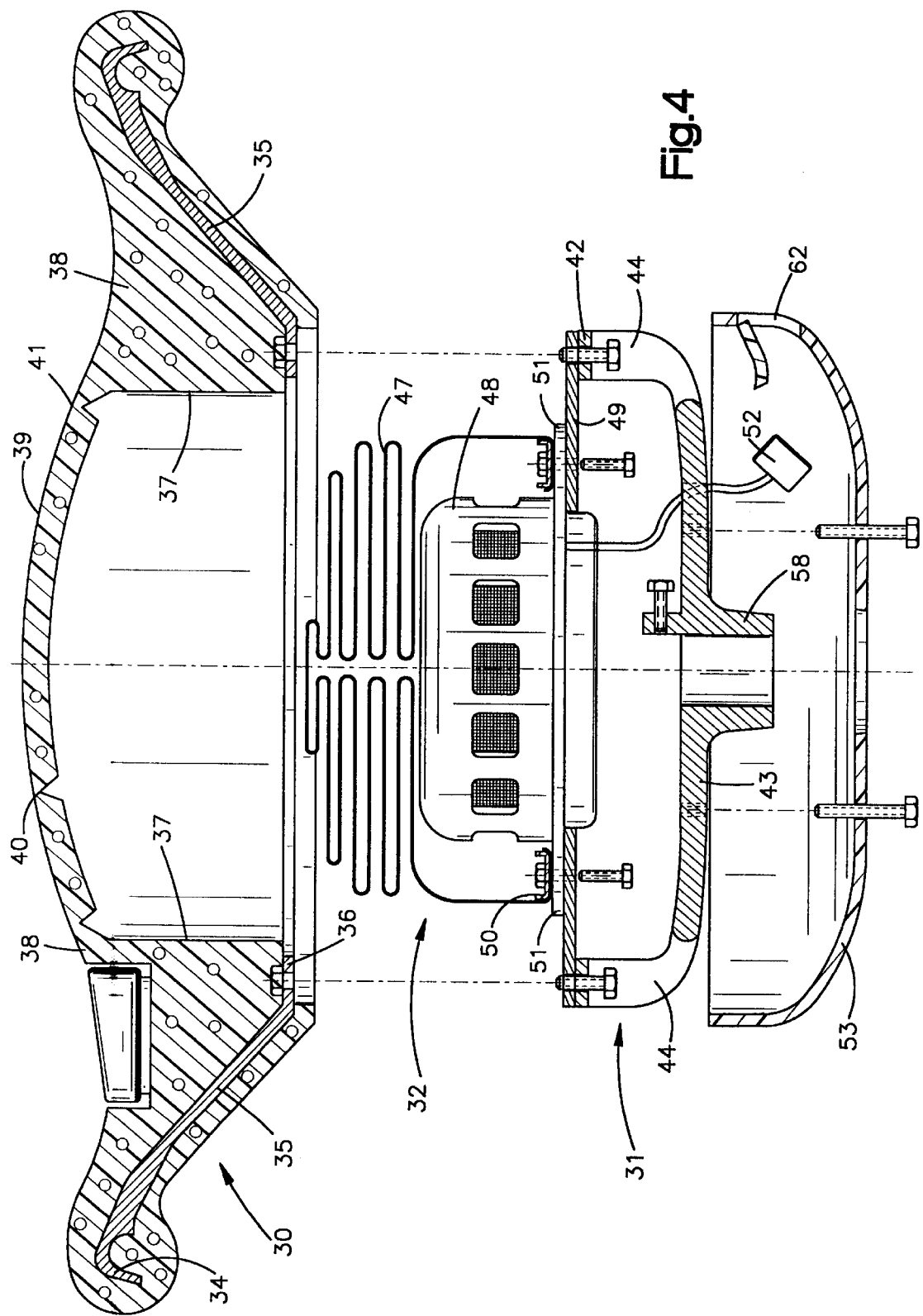

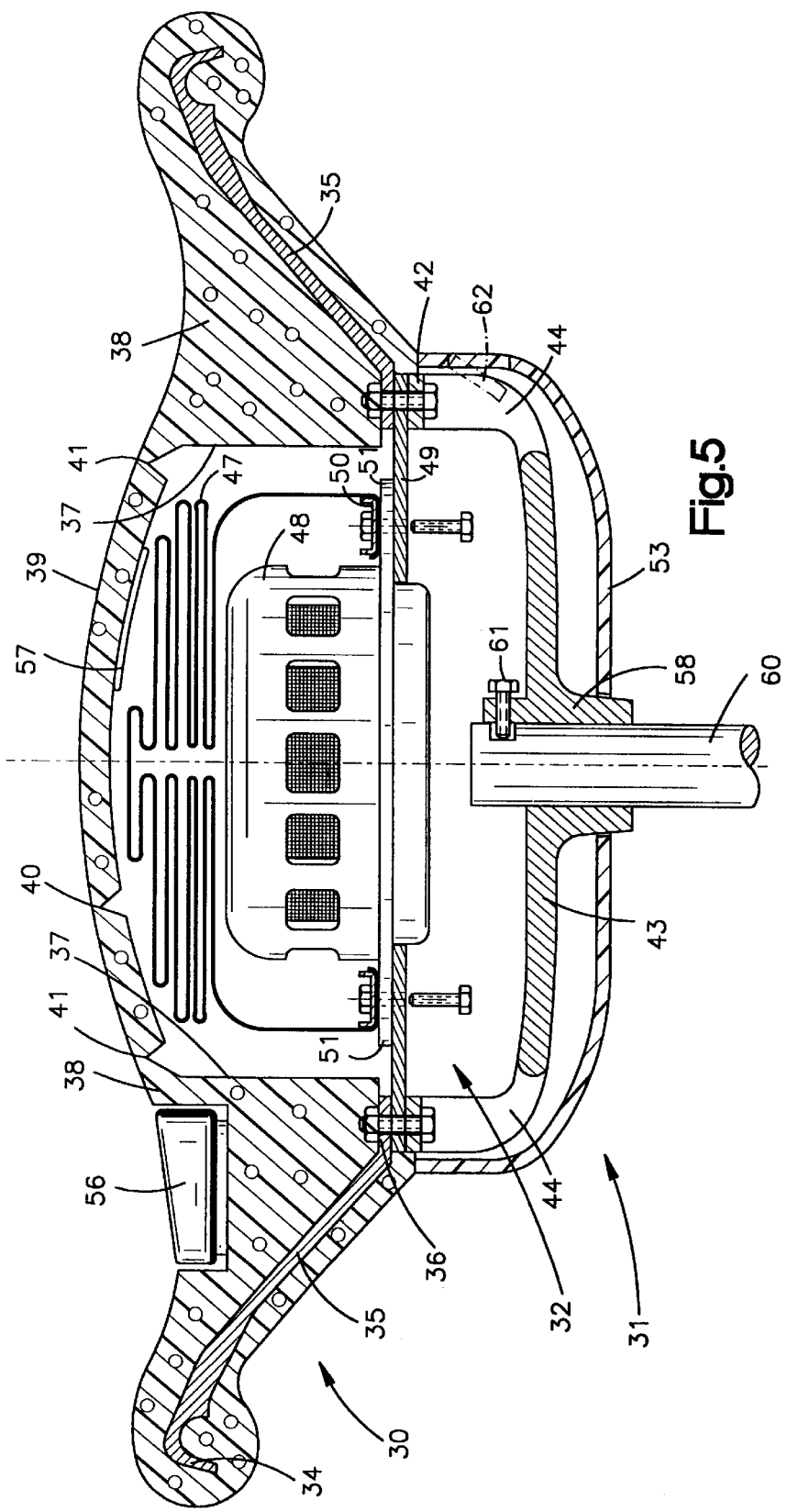

STEERING WHEEL WITH INTEGRAL AIR BAG COVER

This application is a continuation-in-part of application Ser. No. 08/526,330 filed on Sep. 11, 1995, abandoned.

FIELD OF THE INVENTION

The present invention relates to a vehicle occupant restraint device, and particularly relates to an inflatable air bag mounted in the hub of a vehicle steering wheel.

BACKGROUND OF THE INVENTION

A vehicle occupant restraint device, such as an inflatable air bag module, located in the hub of a vehicle steering wheel is well known in the art. Such an air bag module typically includes an inflatable vehicle occupant restraint (or air bag), an air bag inflator for providing inflation fluid to inflate the air bag, a mounting plate for securing the air bag and the inflator to the hub of the steering wheel, an air bag cover, and a device to actuate the inflator. The air bag cover is rupturable upon inflation of the air bag.

Air bag modules are made so that a complete air bag module is insertable into the open hub of a steering wheel and the air bag cover conforms with the upper surface of the steering wheel.

It is customary to insert the air bag module into the open face of the steering wheel while the steering wheel is mounted on the steering column of the motor vehicle being assembled on a motor vehicle assembly line.

Some examples of patents that teach the assembling of air bags in the hub area of a steering wheel while the steering wheel is mounted on the steering column of a motor vehicle include U.S. Pat. No. 3,944,250 to Wulf et al. This patent teaches an inflatable gas cushion defined by a bag with a gas generating means mounted in the hub area of a steering wheel of a motor vehicle after the steering wheel is mounted on the steering column of the motor vehicle.

Other patents such as U.S. Pat. No. 5,280,746 to Adams et al., U.S. Pat. No. 5,294,147 to Edge, U.S. Pat. No. 5,314,203 to Adams et al., U.S. Pat. No. 5,356,173 to Hongou et al., and U.S. Pat. No. 5,358,270 to Kuretake et al. teach various air bag assemblies and/or the installation of an air bag assembly in a steering wheel while the steering wheel is mounted on the steering column of a motor vehicle.

In assembly line production of motor vehicles in motor vehicle assembly plants, the assembly sequence includes the assembly of the steering mechanism, including installation of the steering column, and the mounting of the steering wheel onto the steering column. The air bag assembly, or module, is then mounted into the hub of the mounted steering wheel through the open upper surface or face of the steering wheel.

After an air bag mounted in the steering wheel has been deployed, the air bag module must be removed from the steering wheel and replaced. This is accomplished by removing the complete air bag module from the steering wheel, while the steering wheel remains mounted on the steering column, and inserting a replacement module.

SUMMARY OF THE INVENTION

The present invention provides a complete, steering wheel assembly, which includes an air bag module, as a unitary part. This pre-assembled steering wheel assembly may have any one of a variety of spoke designs and may have any one or more switches in the face of the steering wheel. The pre-assembled assembly may include any graphics and may be made in any color combinations desired. The pre-assembled assembly is a complete unit to be assembled onto the steering column of a motor vehicle.

The steering wheel is pre-assembled from formed upper and lower portions. The upper portion is formed with a rim, spokes and a body defining a part of the upper surface of the steering wheel.

The normal open upper surface of the steering wheel is covered by a surface blended physically into the surface of the body of the steering wheel so as to become an integral part of the upper surface of the steering wheel. This integral surface cover defines an air bag cover for an air bag module integrated into the steering wheel. The body of the steering wheel, which extends below the upper surface, defines a cavity for an air bag module to be integrated into the steering wheel. The components of the air bag module are fitted and secured in the cavity of the steering wheel, through the open back or bottom of the upper portion of the steering wheel. The lower portion of the steering wheel is then coupled to the upper portion over the inserted air bag module components.

The present invention is manifested in several different aspects. From one aspect, the invention provides a novel structure of a steering wheel for a motor vehicle in which at least a portion of an air bag module is an integral part of the steering wheel.

From another aspect, the present invention provides a novel method for mounting an air bag module in a steering wheel.

From still another aspect, the present invention provides a novel original manufacture assembly process relative to the assembly of the steering wheel and the air bag and the subsequent mounting of a steering wheel with pre-mounted air bag onto the steering column of a motor vehicle being assembled.

The present invention is an assembly to be mounted on a vehicle steering shaft which rotates about an axis to steer the vehicle. The assembly comprises a steering wheel rim, an inflatable vehicle occupant restraint, an inflator for providing inflation fluid for inflating the vehicle occupant restraint, and an integral cover covering the steering wheel rim, the vehicle occupant restraint and the inflator. The integral cover defines a chamber in which the inflatable vehicle occupant restraint is located. A mounting is fixedly connected to the steering wheel rim and supports the inflatable vehicle occupant restraint and the inflator. The mounting has a portion which receives the steering shaft and which is non-rotatably attachable to the steering shaft. A threaded fastener fastens the mounting to the steering shaft. The fastener engages the mounting and engages the steering shaft. A cover associated with the mounting encloses the mounting. The cover has an access opening for providing access to the fastener.

The internal steering wheel geometry, below the outer top facing, provides a central cavity, the walls of which serve as the walls of the air bag container and in which is received the air bag module components, except an air bag cover. Access for mounting the air bag module components in the cavity is through the back of the steering wheel. The air bag module components so mounted include a reaction mounting plate, an air bag inflator means and a folded air bag with an air bag retaining ring. The air bag parts are held in position by connecting into internally positioned coupling means, such as nut and bolt coupling means or screw coupling means, accessible through the back or bottom of the steering wheel. The integral cover has rupture (or tear) seams which rupture when the air bag is inflated.

Preferably, the integral steering wheel and air bag module assembly of the present invention includes a central flange frame and a rim connected to each other by spokes. These parts form a skeleton around which the body of the upper portion of the steering wheel is molded. The air bag cover is integrally molded with the body over the opening formed by the central flange frame. The cover and body molded over the rim and spokes form the upper portion of the steering wheel. The lower portion of the steering wheel includes a base frame to which the air bag mounting plate, the inflator, the folded air bag, and the air bag mounting ring are secured. The base frame includes a means for mounting and securing the integral steering wheel and air bag module assembly to the steering column of the motor vehicle.

Provision is made to attach a bottom cover to the lower portion of the integral steering wheel assembly.

Although the preferred embodiment includes a rim, a central flange frame, one or more connecting spokes forming a skeleton over which the body of the upper portion of the steering wheel and the air bag cover are molded, these parts of the skeleton may be eliminated and the complete rim, spokes and upper body, along with air bag cover, may be a fully molded unit.

The upper surface of the body of the steering wheel and integral air bag cover is uninterrupted and continuous. Preferably, internal rupture (or tear) seams and/or lines of flexible peripheral connections between the steering wheel body and the air bag cover are provided to provide a steering wheel and air bag assembly with an upper surface having a seamless outward appearance.

BRIEF DESCRIPTION OF THE DRAWING(S)

The foregoing and other features of the present invention will becomes apparent to one skilled in the art to which the present invention relates upon consideration of the following description of the invention with reference to the accompanying drawings, wherein:

FIG. 3 is an exploded view of one embodiment of the invention;

FIG. 4 is an exploded view, of parts of the embodiment shown in FIG. 3;

FIG. 5 is an assembled view, in cross-section, of the present invention;

DESCRIPTION OF PREFERRED EMBODIMENT

Motor vehicles are for the most part, assembled on assembly lines. The assembly line process follows a predetermined format, in which many parts, referred to as original equipment (OE) parts, are assembled into a final or manufactured product. Historically, motor vehicles are manufactured in this manner.

For convenience and clear understanding of the invention, this description of the invention identifies identical components and/or elements with identical call-out numbers where identical components and/or elements are shown in different figures throughout the drawings.

Figure 1:
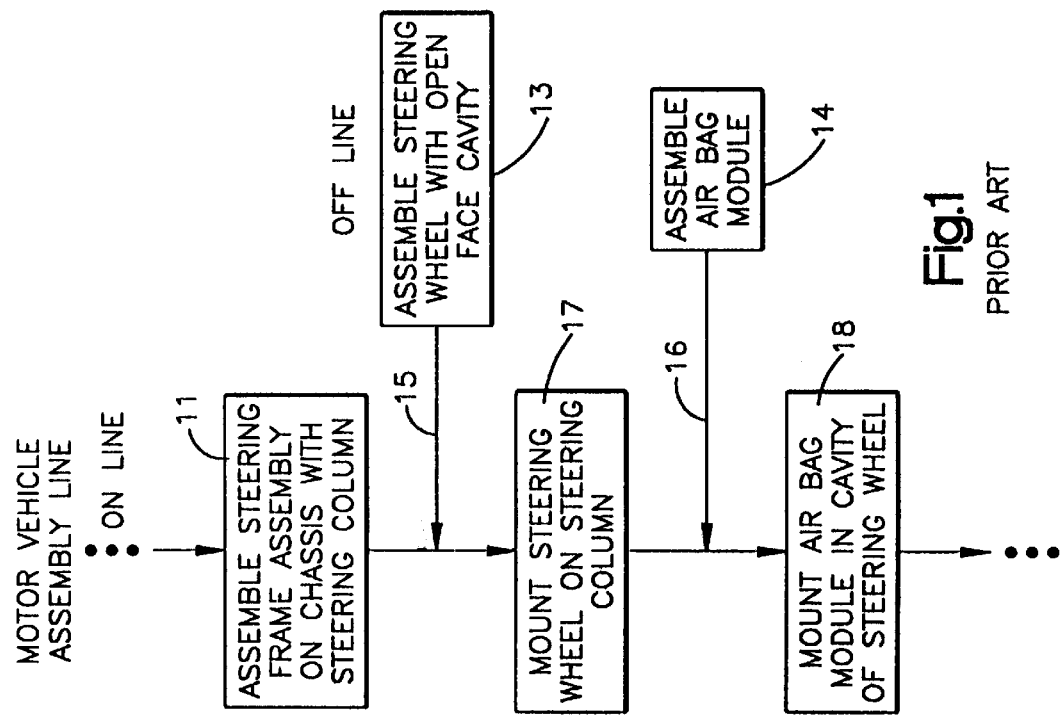
FIG. 1 is part of a flow chart of a prior art motor vehicle assembly line.

FIG. 1 is a flow chart which represents part of a flow chart of a motor vehicle assembly line. It should be understood that the term "motor vehicle" as used herein refers to any motor vehicle, including without limitation, automobile, truck, golf cart, motorcycle, aeroplane, boat or any other commercial or private vehicle that has a steering wheel.

That part of the assembly line flow chart represented in FIG. 1 relates to the prior art assembly of the steering wheel on to a steering frame assembly. The steering frame assembly is mounted or connected to the chassis with the steering column extending from the steering mechanism 11. The steering wheel 13 is presented to the assembly line as a separate OE part 15. The steering wheel is mounted on to the steering column 17.

The air bag module 14 is presented to the assembly line as another separate OE part 16. The air bag module is then mounted in or attached to the steering wheel while the steering wheel is mounted on the end of the steering column 18.

Figure 2:
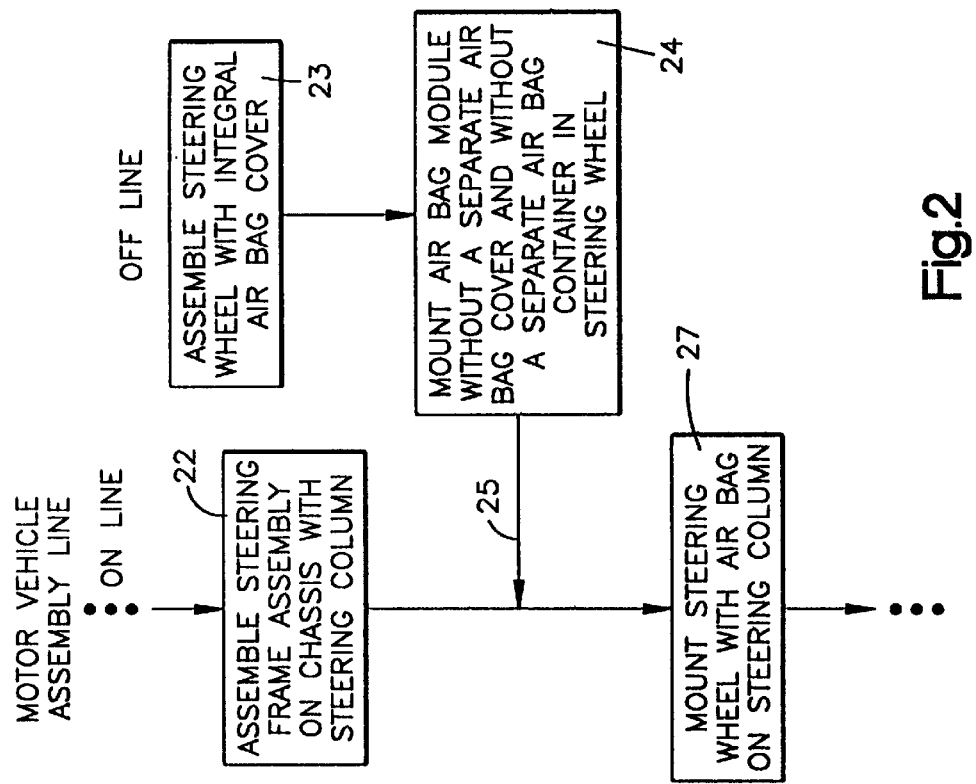
FIG. 2 is part of a flow chart of a motor vehicle assembly line practicing the present invention.

FIG. 2 is a flow chart which represents the same part of a motor vehicle assembly line flow chart as represented in FIG. 1, except the flow chart of FIG. 2 is for practicing the present invention. At function 22, the steering frame assembly is mounted or assembled on to the chassis, with the steering column attached to the steering assembly. This function is essentially the same as shown in FIG. 1.

In accordance with the present invention, the steering wheel is formed with an integral air bag cover 23 and a modified air bag module. That is, an air bag module without an air bag cover and without an air bag container is mounted in the steering wheel, off the assembly line. The steering wheel with the air bag integrated therein is presented to the assembly line 25 and is mounted on to the steering column 27.

Referring to FIGS. 3, 4, 5, 6 and 6a, one embodiment of the invention is represented showing the upper portion 30 of the steering wheel, a lower portion 31 of the steering wheel, and an air bag module 32. The upper portion 30 of the steering wheel includes a steering wheel armature comprising a rim frame 34, a flange ring (or inner frame) 36, and connecting spokes 35. The inner rim of the wheel is defined by descending walls 37 of a body 38. The descending walls define an open area under an air bag cover 39. The air bag cover 39 is an integral part of the top surface or facing of the steering wheel. The inner surface of the air bag cover has one or more tear seams (or rupture lines) 40.

At the meeting of the air bag cover 39 and the body 38 of the steering wheel is a weakened (or bend) line 41. The bend line 41 provides a hinge action when the air bag is inflated and the air bag cover is ruptured along the tear seam 40.

Figure 6:
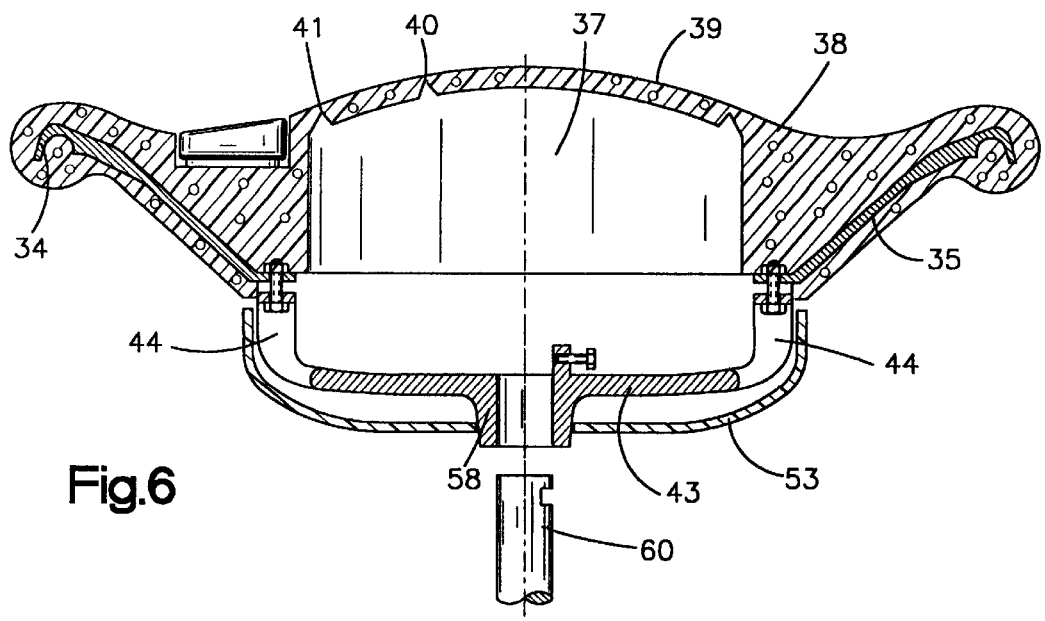
FIG. 6 is a simplified view in cross-section of the invention shown in FIG. 5.
Figure 7A:
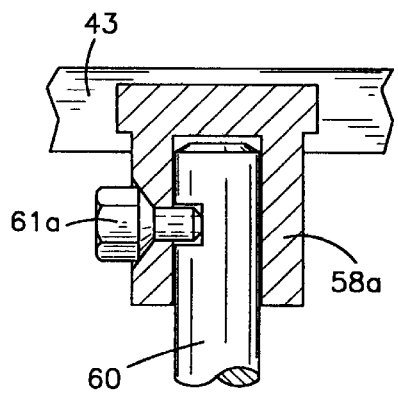
FIG. 7 represents a steering column attachment means for use with the present invention.

The inner frame 36 has mounting holes by which the lower portion 31 of the steering wheel is connected to the upper portion 30, using nut and bolt fasteners or screw fasteners. The lower portion (or base frame) 31 includes a connecting ring 42, a bottom plate 43, and two or more legs 44 which connect the ring 42 to the plate 43. Attached to the bottom plate 43 is a steering column mounting means, as shown in FIGS. 5, 6 and 7.

The air bag module 32 is a modified air bag module, which includes a folded air bag 47, an air bag inflator device 48, a mounting plate 49 and an air bag retaining ring 50. A typical air bag module would include a separate air bag cover and a separate container. However, in the present invention, the air bag cover and the container are both integral parts of the steering wheel. The modified air bag module nests in a cavity (or chamber) of the steering wheel. The mounting plate 49 of the air bag module is secured between the inner frame 36 and the connecting ring 42 by fasteners as illustrated in FIG. 3.

The inflator 48 includes a mounting flange 51 having a plurality of apertures which align with mounting openings in the mounting plate 49 so that fasteners which attach the retaining ring 50 to the inflator flange 51 also attach the inflator to the mounting plate. An electrical connection 52 connects the air bag module into the electrical system of the motor vehicle. A cover 53 with an access opening 62 in the form of a living hinge, is coupled to the bottom plate 43 for enclosing the lower portion 31.

When the components 30, 31 and 53 are coupled together, an air bag container for the modified air bag module is formed by the wall 37 of the body 38, the base frame 31, and the cover 53. It will be noted that in practicing the present invention, assembly of the steering wheel with integrated air bag module is accomplished through the back of the steering wheel, which is a great departure from the conventional assembly of steering wheel on a motor vehicle assembly. In practicing the present invention, there is no visible separation on the upper surface of a steering wheel between the body of the steering wheel and the air bag cover.

FIG. 5 shows a horn button 56 mounted in the body 38 of the upper portion 30 of the steering wheel with electrical connections not shown. An alternate horn button 57 is represented adjacent the lower surface of the air bag cover 39.

The lower portion 31 includes a means for mounting and securing the steering wheel assembly on to the steering wheel column. A column mounting means (or hub) 58 having a generally tubular shape is formed integrally with the bottom plate 43 and extends upward from the plate 43. The hub 58 could also be a separate part which is coupled to the bottom plate 43. The hub 58 fits coaxially over the end of the steering column 60. A securing means (or locking portion) 59 is formed integrally with the bottom plate 43. The locking portion 59 could also be a separate part which is coupled to the bottom plate 43. The locking portion 59 extends partially coaxial with the steering column and includes a threaded opening for receiving a threaded locking bolt 61.

To non-rotatably attach the lower portion 31 to the steering column, the locking bolt 61 is screwed into the locking portion 59 and into engagement with the steering column. The bolt 61 rotates about an axis which is perpendicular to the axis of rotation of the steering column. The locking portion 59 and the locking bolt 61 are inside an enclosure formed by the base frame 31 and the cover 53. The access opening 62 in the cover 53 is radially aligned with and provides access to the locking bolt 61 in the enclosure.

The steering wheel with integrated air bag module may be mounted on the steering column using any of several conventional means. FIG. 7 represents an alternate column mounting means from that shown in FIG. 5. An external mounting sleeve 58a and locking bolt 61a extend from the bottom of the bottom plate 43.

Figure 6A:
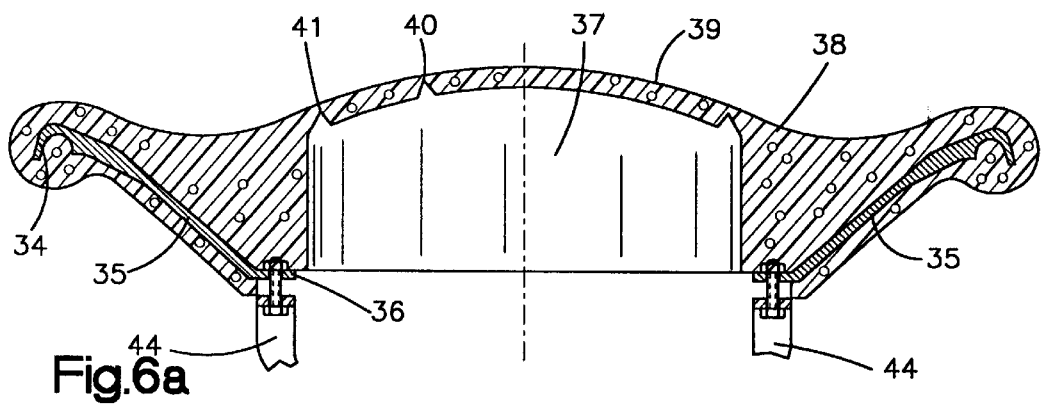
FIG. 6a represents, in cross-section, a portion of FIG. 6.

Attention is directed to FIGS. 6 and 6a which represent the steering wheel without the modified air bag module. These figures show the relationship between the molded body 38 and the air bag cover 39 and the cavity formed by the walls 37, the air bag cover 39 and the base frame 31 and the cover 53. The external geometry of the modified air bag module may generally conform to the internal geometry of the cavity so that the modified air bag module may nest in and be secured in the cavity of the steering wheel. When the modified air bag module is nested in the cavity of the steering wheel, the side walls 37 become the side walls of the air bag container.

It will be appreciated that in a motor vehicle assembly line the steering wheel with integrated air bag module may now, when practicing the invention, be mounted on to the steering column of a motor vehicle as a complete unit.

It will also be appreciated that switches other than the horn switch or button, with electrical connections thereto may be mounted or inserted into the body of the steering wheel.

It will further be appreciated that when practicing the invention, the air bag module used in conjunction with the steering wheel will not require a separate air bag cover nor a separate air bag container, since both members are integrally formed in the steering wheel.

After the air bag of the present invention has been deployed, the steering wheel with the deployed air bag is removed and a replacement steering wheel with integrated air bag is mounted on the steering column.

From the above description of the invention, those skilled in the art will perceive improvements, changes and modifications. Such improvements, changes and modifications within the skill the of the art are intended to be covered by the appended claims.

Having described the invention, the following is claimed:

1. An assembly to be mounted on a vehicle steering column which rotates about an axis to steer the vehicle, said assembly comprising:

a steering wheel armature including a steering wheel rim, an inner frame, and a plurality of spokes connecting said steering wheel rim to said inner frame;

an inflatable vehicle occupant restraint;

an inflator for providing inflation fluid for inflating said vehicle occupant restraint, said inflator including a planar mounting plate;

an integral cover covering said steering wheel armature, said vehicle occupant restraint, and said inflator, said integral cover being made of a single homogeneous material and defining a chamber in which said vehicle occupant restraint is located;

said integral cover having an upper surface and a lower surface facing said vehicle occupant restraint, said lower surface partially defining said chamber and including at least one rupturable seam which ruptures upon inflation of said vehicle occupant restraint by said inflator, said vehicle occupant restraint directly engaging said lower surface of said integral cover upon inflation of said vehicle occupant restraint;

a mounting fixedly connected to said steering wheel armature and supporting said vehicle occupant restraint and said inflator, said mounting including a hub portion which receives the steering column and which is non-rotatably attachable to the steering column;

said mounting further including an upper connecting ring, a bottom plate, and a plurality of legs interconnecting said upper connecting ring and said bottom plate, said hub portion of said mounting being located in said bottom plate, said upper connecting ring of said mounting and said planar mounting plate of said inflator being attached to said inner frame of said steering wheel armature by a first plurality of fasteners;

a transversely extending threaded fastener for fastening said mounting to the steering column, said transversely extending threaded fastener engaging said mounting and engaging the steering column; and a bottom cover attached to said mounting by a second plurality of fasteners, said bottom cover enclosing said mounting and having an access opening for providing access to said transversely extending threaded fastener, said access opening comprising a non-removable living hinge formed of the material of said bottom cover.

2. The assembly of claim 1 wherein said transversely extending threaded fastener is rotatable about an axis of rotation which is perpendicular to the axis of rotation of the steering shaft and extends perpendicular to the axis of the steering shaft.

3. The assembly of claim 1 wherein said mounting further includes a locking portion extending partially coaxial with the steering shaft, said locking portion having a threaded opening for receiving said threaded fastener.

4. The assembly of claim 3 wherein said locking portion is located above said bottom plate of said mounting.

5. The assembly of claim 3 wherein said locking portion is located below said bottom plate of said mounting and is integral with said hub portion.

6. The assembly of claim 3 wherein said access opening in said bottom cover is in radial alignment with said fastener and said locking portion of said mounting.

7. The assembly of claim 1 wherein said lower surface of said integral cover further includes a weakened seam which defines a hinge area of said integral cover.

8. The assembly of claim 1 further comprising an actuatable horn switch secured to said lower surface of said integral cover.

* * * * *